June 30, 1931.    J. WHYTE    1,812,836
BRAKE
Filed May 18, 1929
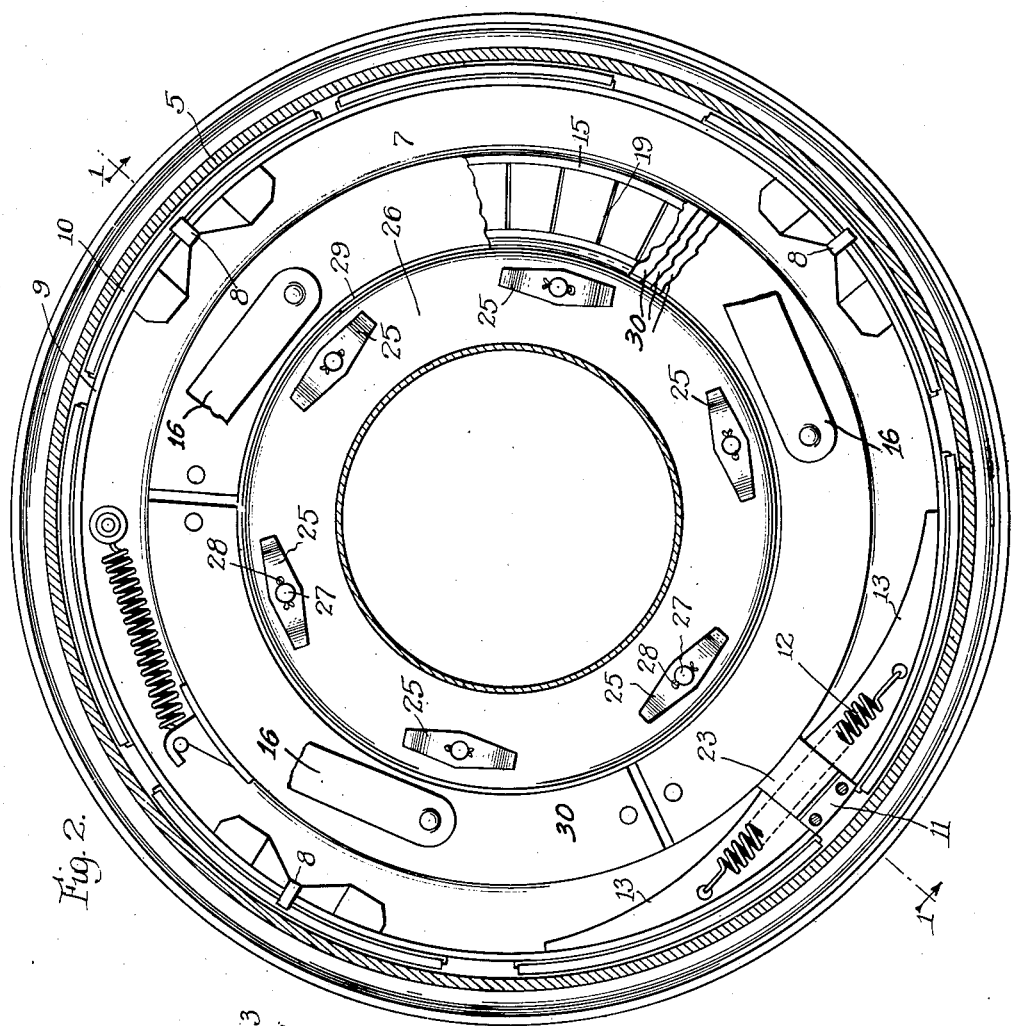
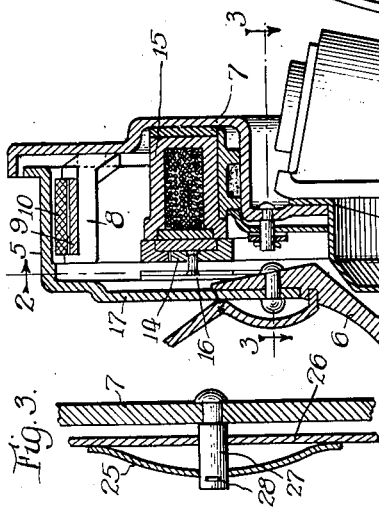
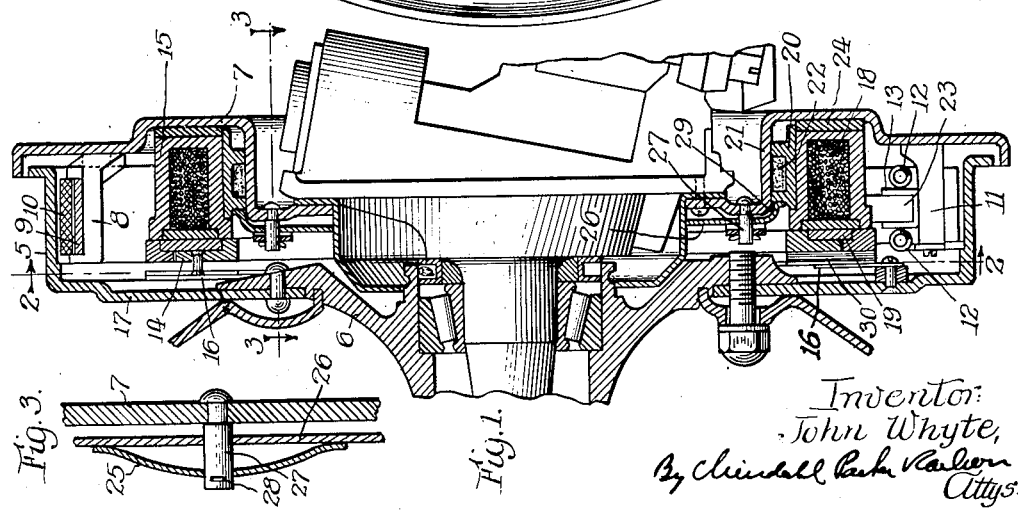
Inventor:
John Whyte,
By Churchill Parker Karlson
Attys.

Patented June 30, 1931

1,812,836

UNITED STATES PATENT OFFICE

JOHN WHYTE, OF BELOIT, WISCONSIN, ASSIGNOR TO WARNER ELECTRIC BRAKE CORPORATION, OF SOUTH BELOIT, ILLINOIS, A CORPORATION OF ILLINOIS

BRAKE

Application filed May 18, 1929.  Serial No. 364,034.

This invention relates to improvements in friction brakes and more particularly to brake operators of the type in which the force creating the frictional braking action is derived from the momentum of the part whose motion is to be controlled. In brake operators of this class, one of the friction elements usually actuates the main brake through the medium of a power multiplying mechanism and therefore moves a substantial angular distance in applying the brake. To release such brakes reliably, it has been found desirable to provide relatively strong spring means for restoring the friction element to and effectually maintaining it in brake-released position. A sudden impact resulting in an objectionable noise is sometimes produced by the action of such a restoring means.

The primary object of the present invention is to moderate the action of the restoring spring means in a momentum brake operator so that no objectionable noises are produced even though a strong restoring spring is employed.

The invention also aims to provide a novel mounting for the coacting friction elements in a momentum brake operator whereby to prevent objectionable vibration of such elements when brought into gripping engagement.

Other objects and advantages of the invention will become apparent from the following detailed description taken in connection with the accompanying drawings, in which:

Fig. 1 is a fragmentary view of a vehicle wheel equipped with a brake embodying the features of the present invention, the brake being shown as a section taken along the line 1—1 of Fig. 2.

Figs. 2 and 3 are sectional views taken respectively along the lines 2—2 and 3—3 of Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawings, the invention is embodied in an operator for a vehicle brake which includes a drum 5 mounted on and rotatable with a wheel 6. The open end of the drum is closed by a non-rotatable disk or anchor plate 7 from which projects a plurality of rigid annularly spaced lugs 8 around which extends a flexible band 9 carrying segments 10 of friction material. The ends of the band terminate adjacent each other and on opposite sides of a rigid stop 11 which constitutes the anchor for sustaining the frictional torque resulting from expansion of the band. The ends of the band are normally drawn into brake-released position against the stop 11 by one or more contractile springs 12 stretched between brackets 13 rigid with the ends of the band. The springs 12 are under a substantially initial tension so as to insure instantaneous and reliable release of the brake.

Incorporated in the brake structure is an operator of the momentum type comprising a pair of substantially rigid metal rings 14 and 15 composed of magnetic material and arranged to be drawn into axial gripping engagement by electromagnetic action. In the present instance, the ring 14 constitutes a magnetic armature and is carried by the drum so as to rotate therewith. For this purpose it is secured at annularly spaced points to the ends of a plurality of tangentially extending spring strips 16 whose other ends are secured at annularly spaced points around the drum flange 17.

The other ring 15 constitutes the core of an electromagnet of U-shaped cross section forming concentric annular poles between which is disposed a winding 18. Plates 19 of non-magnetic and wear resisting material sustain the pressure resulting from the gripping engagement of the friction elements when the winding 18 is energized.

The magnet is mounted for oscillatory movement about the drum axis and for this purpose is secured to a ring 20 of bearing material which is rotatable about a cylindrical bearing surface formed by a flange portion 21 of the anchor plate 7. The bearing surface may be lubricated by graphite or other anti-friction material disposed in a pocket 22 in the ring 20.

The movement of the magnet ring in either direction away from normal brake-released position is utilized to apply the main brake by spreading the ends of the band 9 apart. This is accomplished by an expanding member in the form of a rigid lug 23 projecting outwardly from the magnet ring into the space between the adjacent ends of the two brackets 13 and terminating short of the stop 11. Thus when the magnet is energized with the drum and the armature ring rotating in one direction, the magnet will grip the armature and move therewith for an angular distance sufficient to expand the band against the drum surface. In this action the lug 23 carries one end of the band away from the stop 11 while the other end is held by the stop which sustains the torque resulting from the braking action. The degree of the braking force is proportional to the intensity of the current energizing the winding 18. Movement of the magnet ceases when the frictional reaction of the drum on the band balances the force applied to the band by the magnet, the latter then slipping relative to its armature until the motion of the wheel has been arrested or the winding 18 deenergized.

The springs 12, acting through the medium of a lug 23, serve to restore the magnet to brake-released position (Fig. 2) when the winding 18 is deenergized. In the actuating movement of the magnet, that is movement away from brake-released position, the springs 12 are stretched considerably with the result that the tension thereof is increased so that a substantially greater restoring force will be exerted on the magnet as compared to the force exerted when the magnet is in brake-released position. Such additional force would, if allowed to act without moderation, return the magnet to brake-released position with such a sudden snap action as to produce an objectionable noise when the end of the band strikes the stop 11 and the lug 23 engages the bracket 13 on the anchored end of the band.

To avoid the above objectionable feature, at the same time permitting the use of a return spring having the desired initial tension, means is provided for exerting a counter-acting force which resists the action of the restoring springs and so arrests the motion of the parts in approaching brake-released position that no objectionable noise will be produced. In the present instance, this moderating force is produced frictionally by urging the magnet ring 15 with a predetermined pressure and in an axial direction against a non-rotatable friction surface formed by a ring 24 of friction material secured against the inner surface of the anchor plate 7 and the flattened back surface of the magnet ring. The force is exerted by a plurality of springs in the form of resilient strips 25 bowed as shown in Fig. 3 and arranged in annularly spaced relation around the inner surface of a sheet metal annulus, which is mounted on pins 27 projecting inwardly from the plate 7. The springs are held on the pins 27 by cotter key abutments 28 and their ends act on the inner surface of the annulus 26 to urge the same toward the anchor plate and thereby press a flange 29 thereon against the bearing ring 20.

With the arrangement thus provided it will be apparent that the magnet ring is firmly urged against the friction material 24 with a predetermined constant force. Preferably the magnitude of this force is such that the resulting frictional force acting in a tangential direction to resist the actual movement of the magnet approaches but is somewhat less than the initial tension of the restoring springs 12. The frictional force is substantially constant at all times and acts to oppose the movement of the magnet in either direction, being readily overcome by the momentum operator during setting of the brake. When the magnet is being moved toward brake-released position, the frictional force counteracts the springs 12 and gradually becomes more effective in moderating the spring action as the magnet approaches brake-released position inasmuch as the frictional force remains constant and the tension on the springs 12 decreases by shortening of the springs. Thus the velocity of the magnet is gradually reduced so that the noise resulting from the impact of parts is not objectionable.

The spring means producing the frictional drag on the magnet ring performs the additional function of eliminating vibration in the friction system formed by the two rings 14 and 15. This is effected by urging the magnet ring firmly against the substantially rigid backing formed by the anchor plate 7, thereby reducing the tendency of the magnet ring to vibrate when its surface is brought into gripping engagement with the armature surface. Vibration of the floating friction element, that is the armature ring 14, is dampened by securing to it a non-resonant body such as a plurality of sheet metal laminations 30.

It will be apparent that I have provided a simple and effective arrangement for eliminating objectionable sounds which are apt to develop in the service operation of a friction brake operator of the momentum type.

No claim is made herein for the construction of the brake per se and the manner of supporting the magnetic elements, which features of the brake herein disclosed form the subject matter of my copending applications, Serial Nos. 320,129, filed November 17, 1928 and 393,955, filed September 20, 1929, and also of an application by Arthur P. Warner, Serial No. 273,706, filed April 28, 1928.

I claim as my invention:

1. A friction brake of the momentum type combining a rotatable drum, braking means cooperating with a cylindrical surface of said drum, a non-rotatable plate mounted at the open end of said drum and supporting said braking means, a pair of friction rings adapted for axial gripping engagement, one of said rings being rotatable with the drum, the other being mounted on said plate for oscillatory movement about the drum axis, means for causing gripping engagement of said rings, means operable in the movement of said oscillatory ring away from brake-released position to actuate said braking means, spring means operable to restore said oscillatory ring to brake-released position when the gripping pressure between said rings is relieved, and spring means acting on said oscillatory ring at a plurality of annularly spaced points to press the ring in a direction toward said non-rotatable plate, whereby to produce a frictional force resisting but permitting the restoring movement of the driven ring.

2. A friction brake of the momentum type combining means providing a rotatable cylindrical surface, braking means adapted to engage said surface, a non-rotatable support for said braking means providing a substantially flat annular surface disposed in a plane perpendicular to the rotational axis of said first mentioned surface, a pair of coacting friction rings, one rotatable with said first mentioned surface, the other being mounted opposite said last mentioned surface and operable by movement away from a normal brake-released position to actuate said braking means, and constantly acting spring means pressing said driven friction ring against said last mentioned surface.

3. A friction brake of the momentum type combining means providing a rotatable friction surface, non-rotatable braking means adapted for gripping engagement with said surface, a pair of friction elements adapted for gripping engagement, one being rotatable with said surface, the other being mounted for oscillatory movement about the rotational axis of said surface and adapted by movement away from a normal brake-released position to actuate said braking means, a contractile spring normally acting to restore said oscillatory element to brake-released position, said spring being under tension when said last mentioned element is in brake-released position, and other spring means acting on said oscillatory element to produce a frictional force of constant magnitude acting to resist the action of said restoring spring means.

4. A friction brake of the momentum type combining means providing a rotatable friction surface, non-rotatable braking means adapted for gripping engagement with said surface, driving and driven friction elements adapted for gripping engagement, the driving element being movable with said surface, the driven element being movable away from a normal brake-released position to actuate said braking means, a contractile spring arranged to be extended from one or the other of its ends in the movement of said driven element away from brake-released position, and means operable to apply a frictional force resisting the movement of said driven element whereby to moderate the action of said spring means in restoring said driven element to brake-released position after movement in either direction away from such position.

5. A friction brake of the momentum type combining means providing a rotatable friction surface, non-rotatable breaking means adapted for gripping engagement with said surface, driving and driven friction elements adapted for gripping engagement, the driving element being movable with said surface, the driven element being movable away from a normal brake-released position to actuate said braking means, spring means operable to restore said driven element to brake-released position, and other means acting to moderate the action of said spring means.

6. A friction brake of the momentum type combining means providing a rotatable friction surface, non-rotatable braking means adapted for gripping engagement with said surface, driving and driven friction elements adapted for gripping engagement, the driving element being movable with said surface, the driven element being movable away from a normal brake-released position to actuate said braking means, spring means operable to restore said driven element to brake-released position, and means operable as an incident to the movement of said driven element to apply a constant force resisting the movement of the element to brake-released position.

7. A friction brake of the momentum type combining means providing a rotatable friction surface, non-rotatable braking means adapted for gripping engagement with said surface, driving and driven friction elements adapted for gripping engagement, the driving element being movable with said surface, the driven element being movable away from a normal brake-released position to actuate said braking means, means for restoring said driven element to brake released position, said last mentioned means being less effective when the element is in brake-released position than when the element is in brake-applying position, and means acting with a substantially constant yielding force to resist restoring movement of said driven element by said last-mentioned means.

8. A friction brake of the momentum type combining means providing a rotatable friction surface, non-rotatable braking means adapted for gripping engagement with said surface, driving and driven friction elements adapted for gripping engagement, the driving element being movable with said surface, the driven element being movable away from a normal brake-released position to actuate said braking means, means operable to restore said driven element to brake-released position, and means exerting a force on said driven element in opposition to said restoring means for gradually decreasing the effectiveness of said restoring means as the driven element moves to brake-released position.

9. A friction brake of the momentum type combining means providing a rotatable friction surface, non-rotatable braking means adapted for gripping engagement with said surface, driving and driven friction elements adapted for gripping engagement, the driving element being movable with said surface, the driven element being movable away from a normal brake-released position to actuate said braking means, means for applying a force to said driven element acting to restore the element to brake-released position, and means exerting a resisting force on the element which, when the element reaches brake-released position, approaches but does not exceed the magnitude of said restoring force.

10. A friction brake of the momentum type combining means providing a rotatable friction surface, non-rotatable braking means adapted for gripping engagement with said surface, a pair of axially engageable friction rings, one rotatable with said surface, the other being movable between a normal brake-released position and a brake-applying position to apply and release the brake, a member providing a substantially rigid backing for said last mentioned ring, and normally acting means operable to urge the ring again said backing member.

11. A friction brake of the momentum type combining means providing a rotatable friction surface, non-rotatable braking means adapted for gripping engagement with said surface, a pair of axially engageable friction rings, one rotatable with said surface, the other being movable between a normal brake-released position and a brake-applying position to apply and release the brake, a member providing a substantially rigid backing for one of said rings, means for maintaining said last mentioned ring in contact with said backing, means floatingly supporting said other ring, and a non-resonant member secured to said rotatable ring and acting to dampen the vibration thereof.

In testimony whereof, I have hereunto affixed my signature.

JOHN WHYTE.